United States Patent [19]
Morris et al.

[11] Patent Number: 5,859,999
[45] Date of Patent: Jan. 12, 1999

[54] SYSTEM FOR RESTORING PREDICATE REGISTERS VIA A MASK HAVING AT LEAST A SINGLE BIT CORRESPONDING TO A PLURALITY OF REGISTERS

[75] Inventors: Dale C. Morris, Menlo Park; Jack D. Mills, San Jose, both of Calif.

[73] Assignee: Idea Corporation, Cupertino, Calif.

[21] Appl. No.: 725,573

[22] Filed: Oct. 3, 1996

[51] Int. Cl.$^6$ ............................ G06F 9/312; G06F 9/305
[52] U.S. Cl. ............................................ 395/565; 395/569
[58] Field of Search .................................. 395/386, 564, 395/565, 566, 569

[56] References Cited

U.S. PATENT DOCUMENTS

| 4,197,578 | 4/1980 | Wada et al. | 395/387 |
| 4,445,173 | 4/1984 | Pilat et al. | 395/569 |
| 5,416,911 | 5/1995 | Dinkjian et al. | 395/392 |
| 5,664,215 | 9/1997 | Burgess et al. | 395/569 |
| 5,694,565 | 12/1997 | Kahle et al. | 395/392 |

OTHER PUBLICATIONS

Motorola, *MC68030 Enhanced 32–Bit Microprocessor User's Manual Second Edition*, Prentice Hall, 1989.

Primary Examiner—Richard L. Ellis
Attorney, Agent, or Firm—Blakely Sokoloff Taylor & Zafman

[57] ABSTRACT

The present invention provides a method and apparatus for restoring a predicate register set. One embodiment of the invention includes decoding a first instruction which specifies a restoring operation to be performed on a predicate register set. In response to the first instruction, a mask is used to select a plurality of the predicate registers that are to be restored. The mask of the present invention consists of a first set of bits, with each bit of the first set of bits corresponding to a register in the predicate register set. When a bit of the first set of bits is set to one, the predicate register corresponding to that bit is restored. In one embodiment, the mask further includes one bit corresponding to a plurality of registers in the predicate register set, wherein when that bit is set to one, the plurality of registers corresponding to that bit are restored.

21 Claims, 2 Drawing Sheets

SYSTEM FOR RESTORING PREDICATE REGISTERS VIA A MASK HAVING AT LEAST A SINGLE BIT CORRESPONDING TO A PLURALITY OF REGISTERS

FIELD OF THE INVENTION

The present invention relates to computer systems, and, in particular, to a method and apparatus for restoring a predicate register set.

BACKGROUND OF THE INVENTION

Computer programs consist of a set of instructions intended to be executed on a computer system to perform some useful task. Typically, programs are designed to execute certain instructions conditionally, i.e. if one or more conditions are satisfied then the conditional instructions will be executed otherwise they will not be executed. In this context, "executed" means that an instruction performs a specified operation which will result in a modification of the state of the computer system and/or result in a particular sequence of events within the computer system. In traditional computer systems conditional execution is implemented via the branch or jump instruction well known in the art. "Predicated execution" or "predication" (sometimes referred to as "conditional execution" or "guarded execution") is a technique whereby instructions can be executed conditionally without the need for a branch instruction.

Predicated execution is implemented by associating a "predicate" with an instruction where the predicate controls whether or not that instruction is executed. If the predicate evaluates to "true", the instruction is executed; if the predicate evaluates to "false", the instruction is not executed. The definition of "true" and "false" may vary with each embodiment. The function by which the predicate is determined to be true or false may also vary with each embodiment. For example, some embodiments may define the predicate to be a single bit where a value of one is true and a value of zero is false while alternate embodiments may define the predicate to be multiple bits with a specific function for interpreting these bits to be true or false.

By conditionally executing instructions under the control of a predicate, predication eliminates branch instructions from the computer program. This is beneficial on wide and deep pipelines where the flushes due to branch mispredictions causes several "bubbles" in the execution pipeline, giving rise to a large loss of instruction execution opportunities. Predication improves performance by eliminating branches, and thus any associated branch mispredictions. Since branch instructions typically cause breaks in the instruction fetch mechanism, predication also improves performance by increasing the number of instructions between branches thus increasing the effective instruction fetch bandwidth.

Predicates are typically stored in a dedicated "predicate register set". The exact form of the predicate register set may vary with each embodiment. For example, some embodiments may define a plurality of registers each containing a single predicate while alternate embodiments may define the predicates to be one or more bits in a "condition code" or "flags" register. The exact number of predicates may also vary with embodiment. For example, one embodiment may define 64 predicates while another may define only 8 predicates.

There are typically two methods employed to access predicates: individual and "broadside". Predicates are typically written individually by compare instructions and read individually by any predicated instruction. Broadside access refers to reading or writing all predicates simultaneously in a single access. Predicates are typically read and written in broadside fashion for procedure entry and exit and for context switching (a "context switch" occurs when execution on the presently active "process" or "task" is stopped and another process is selected for execution). In broadside access the contents of the predicate register set are typically saved/restored to/from another register in the processor or to/from a memory location in the computer system Typically the predicates in the predicate register set are equally accessible to all procedures (also known in the art as "functions" or "subroutines") in a computer program. This necessitates the specification of rules by which the sharing can occur so that one procedure does not overwrite the predicates of another procedure. For this purpose registers are divided into two classes: "scratch" and "preserved". By software convention, the contents of scratch registers are lost at the point of a procedure call; the contents of preserved registers are maintained across a procedure call. Note that the division of registers into scratch and preserved classes is a convention used by software and is typically not enforced by the instruction set architecture. This division necessitates certain actions on the part of each procedure. For example, assume procedure A (the "caller") is calling procedure B (the "callee"), therefore a all instruction to procedure B will appear within procedure A and a return instruction to procedure A will appear at the end of procedure B. If procedure A needs the contents of any scratch register after the call to procedure B, then it must save their contents before the instruction that calls procedure B and must restore their contents after said instruction. If procedure B needs to use any preserved register then it must save their contents before using them and must restore their contents before returning to procedure A.

In the situation where procedure B does use preserved predicate registers, when procedure B restores the preserved predicate registers all predicates will be overwritten since, as discussed above, predicates are accessed in broadside fashion for procedure entry and exit. If any instructions following this broadside restore need to read the predicate register set (e.g. any predicated instruction), it would be necessary to insert additional instructions to re-write the predicate register set after the broadside restore and before said predicated instructions. These additional instructions reduce the performance of the procedure by increasing the number of sequentially dependent instructions. In addition, due to the use of pipelining in modern processors, performance may be further degraded due to pipeline stalls caused by instructions that read the predicates waiting on a previous broadside predicate restore to complete.

Therefore, there is a need for a method and apparatus that overcome the disadvantages of the prior art by restoring selected predicate registers of a predicate register set in response to a single instruction.

SUMMARY OF THE INVENTION

The present invention provides a method and apparatus for restoring a predicate register set. One embodiment of the invention includes decoding a first instruction which specifies a restoring operation to be performed on the predicate register set. In response to the first instruction, a mask is used to select a plurality of predicate registers from the predicate register set that are to be restored. The selected plurality of predicate registers are then restored.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus are described for using a mask to control the restore of a plurality of selected predicate registers in response to a single instruction.

Figure 1:
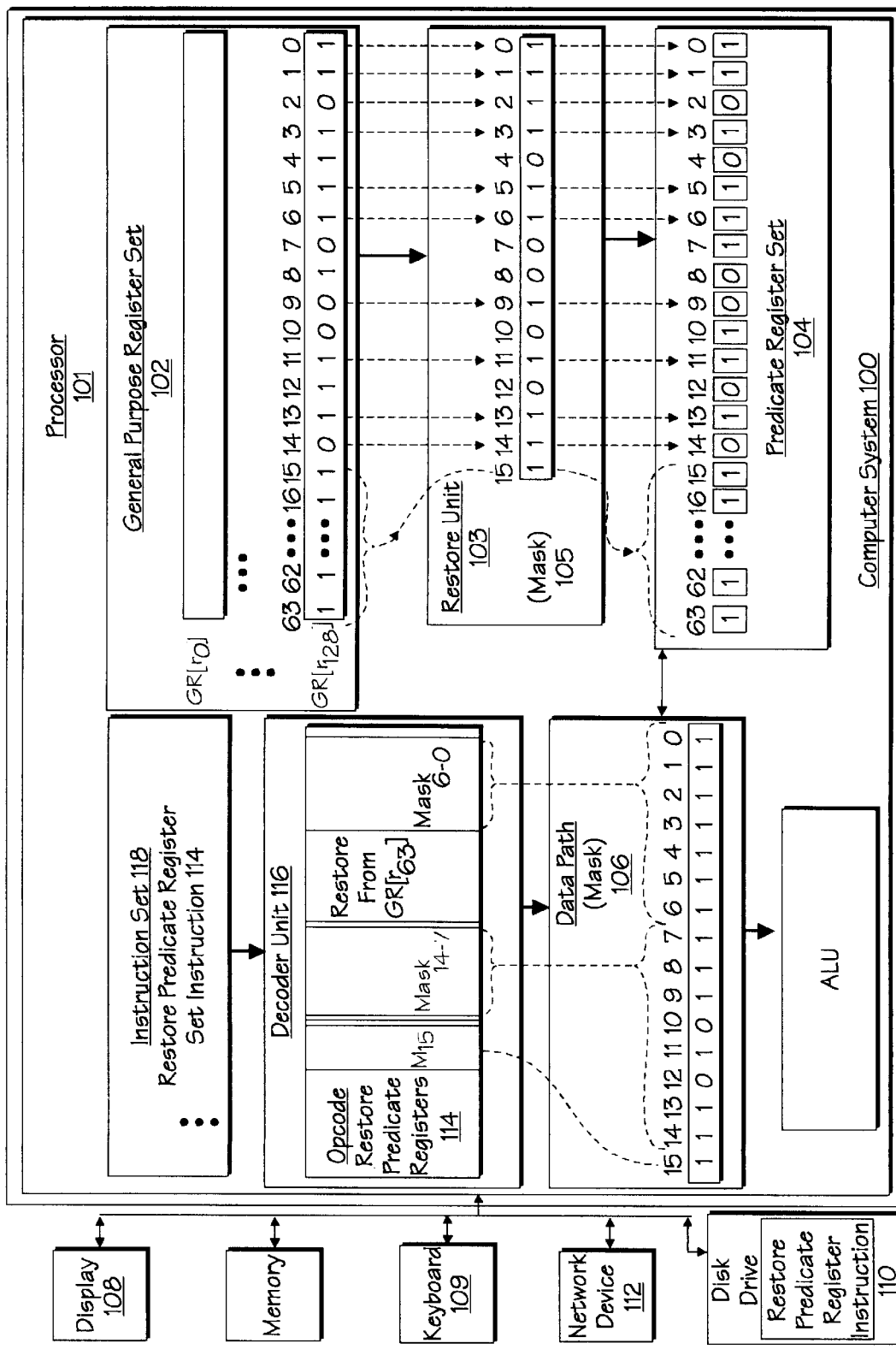
FIG. 1 illustrates an example of a computer system which implements the present invention according to one embodiment.

FIG. 1 is an examplary a computer system 100 that implements the present invention. As shown, the computer system includes a processor 101 for executing instructions and performing other functions to operate the computer system. Attached to the computer system is a monitor 108, keyboard 109, disk drive, 110 and a network device 112 that enables the computer system to communicate with other computer devices via a network.

Inside the processor of FIG. 1, a predicate register set 104 is shown. In one embodiment of the invention, the predicate register set consists of 64 one-bit-wide separate registers. In alternative embodiments, more or fewer predicate registers may be provided in the register set, or the predicate registers may be wider (i.e. more than one bit wide), without departing from the scope of the invention.

During the execution of a section of code, data stored in the predicate registers may be copied to a register of a general purpose register set 102. For example, when a procedure is called, data stored in the predicate registers may be copied to a general purpose register such as the 63rd general purpose register ($GR_{63}$) shown in FIG. 1, so that the predicate registers may be used during execution of the procedure without losing the data stored in the predicate register set prior to calling the procedure.

The present invention provides a method and apparatus to restore the data back into the predicate register set 104. In particular, the present invention uses a mask 105 to select which data from the general purpose register will be restored into the predicate register set in response to a single instruction. As a result, the present invention provides the benefit of enabling a programmer to select which predicate registers are to be restored. This improves the performance of computer programs by obviating the need for additional instructions and by eliminating stalls in pipelined processors. Moreover, it will be appreciated by one skilled in the art that the present invention can be used to restore registers other than predicate registers.

In one embodiment, the mask of the present invention is provided as an immediate value in a restoring instruction 114 selected from an instruction set 118. The immediate mask value indicates which predicate registers will be restored. In alternative embodiments, the mask value may be provided from alternative sources such as a general purpose register or a memory location in which case the address of the source would be contained in the restoring instruction.

After the restoring instruction is decoded by the decoder unit 116, the mask value is transferred via a data path 106 to a restore unit 103, which uses the mask to identify which predicate registers are to be restored. In one embodiment, the mask consist of a set of bits, with each bit of the mask corresponding to a single predicate register. When a given bit in the mask is set to one, the predicate register corresponding to that particular mask bit is to be restored. When a given bit in the mask is set to 0, the corresponding predicate register is not to be restored.

For example, referring to the mask shown in the restore unit of FIG. 1, bits 0–3 of the mask are shown as set to one. As a result, predicate registers 0–3 are therefore to be restored with the data from the corresponding bit positions 0–3 of the general purpose register $GR_{63}$. On the other hand, when a bit included in the restoring mask value is set to zero (e.g. mask bit 10), the corresponding predicate register will not be restored and its value will remain unchanged. It is to be appreciated that alternative interpretations of the mask value are possible without departing from the spirit of the present invention. For example, a mask value of zero could cause a predicate register to be restored and a value of one could cause the predicate register to remain unchanged.

In addition, in one embodiment, one of the mask bits corresponds to a plurality of predicate registers. That is, one of the several mask bits is used to indicate whether or not all of a plurality of predicate registers are to be restored, while the remaining mask bits correspond in a one-to-one basis with the remaining predicate registers. For example, as shown in FIG. 1, when mask bit 15 is set to one, predicate registers 63-15 will be restored with the data currently stored in bit positions 63-15 of the $GR_{63}$.

By having one bit in the mask correspond to several predicate registers and the remaining mask bits correspond to the remaining predicate registers in a one-to-one basis, a smaller number of mask bits are able to control a larger number of predicate registers thus allowing the mask of the present invention to fit in an instruction having a fixed size. In alternative embodiments, more than one mask bits could be defined to control the restore of multiple predicate registers.

In one embodiment, the restore unit 103 of the present invention, shown in FIG. 1, may consist of a specialized circuit having a separate write enable connection coupled to each separate predicate register. When a given bit of the mask is set to one, the respective write enable connection would be turned on, thereby allowing the circuit to copy data from a bit position in a general purpose register into the respective predicate register. In this manner, the predicate registers may be restored in parallel. It will be apparent, however, to those skilled in the art that in alternative embodiments the restore unit may consist of other circuit arrangements that allow a mask to indicate which predicate registers are to be updated.

Figure 2:
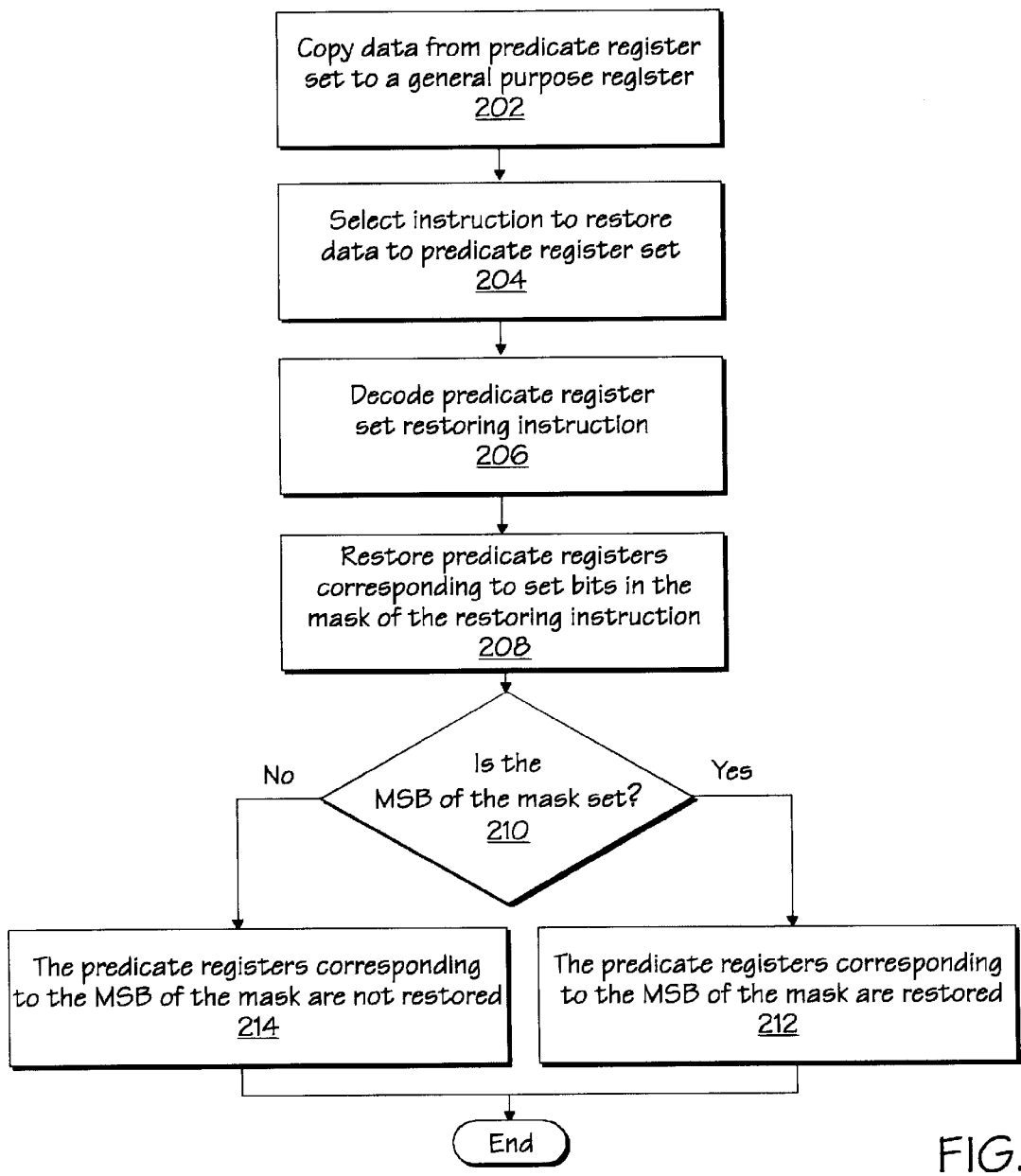
FIG. 2 illustrates a flow diagram describing the steps of the present invention according to one embodiment.

Referring to FIG. 2, a flow diagram is illustrated which describes the steps of the present invention in more detail. In step 202, data stored in the predicate register set is copied to a general purpose register. In alternative embodiments, the predicate register set could be saved to other memory devices without departing from the scope of the invention.

In step 204, an instruction to restore a selected plurality of the predicate registers is selected from an instruction set provided in the processor, as shown in FIG. 1. Alternatively, the restoring instruction may be provided on another computer-readable storage medium having stored thereon micro-instructions which can be used to program a computer to perform a process according to the present invention. The storage medium can include, but is not limited to, any type of disk including floppy disks, optical disks, CD-ROMs, and magneto-optical disks, or any type of memory including ROMs, RAMs, EPROMs, EEPROMs, magnetic or optical cards, or any type of media suitable for storing electronic instructions.

In one embodiment, the mask used in the present invention consists of 16 bits. Mask bits 14-0 each respectively correspond to one of the predicate registers 14-0. Bit 15 of the mask corresponds to predicate registers 63-15. That is, if bit 15 of the mask is set, then predicate registers 63-15 will be restored. However, it will be apparent to one skilled in the art that the number of bits in the mask of the present invention may vary. Moreover, it will be apparent to those skilled in the art that multiple sets of mask bits can each respectively correspond to a separate set of predicate registers.

In one embodiment, the predicate register 0 is always set to one. This means that mask bits 14-0 may then correspond to predicate registers 15-1, and mask bit 15 may correspond to predicate registers 63-16.

Figure 3:
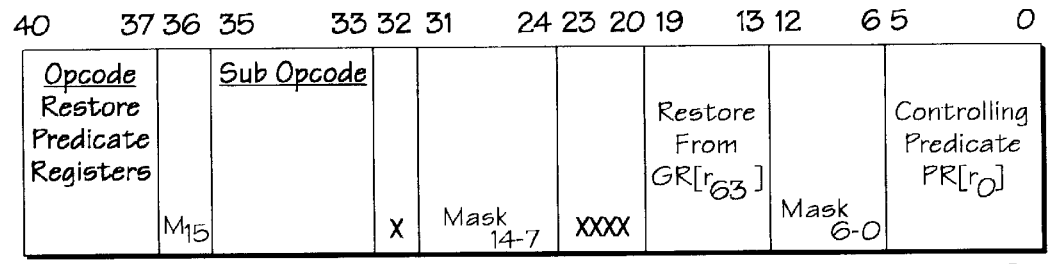
FIG. 3 illustrates an instruction format used by the present invention according to one embodiment.

FIG. 3 illustrates one embodiment of the restoring instruction having a fixed length of forty-one bits. Bit positions 5-0 of the instruction identify a predicate register (PR) which controls execution of the restoring instruction. If a predicate register is not to be used to control execution of the restoring instruction, bit positions 5-0 of the instruction will contain all zeros.

Bit positions 12-6 of the restoring instruction represent the mask bits 6-0. Bit position 19-13 of the instruction identify the general purpose register (GR) that contains the data that is to be restored into the predicate register set. In alternative embodiments, bit positions 19-13 of the restoring instruction could include a memory address if the data used to be restored to the predicate registers is stored in a memory location rather than a general purpose register.

Bit positions 23-20 of the instruction are unused. Bit positions 31-24 of the instruction represent mask bits 14-7. Bit position 32 of the instruction is unused. Bit position 35-33 of the instruction represent a subopcode which, in the case of the present invention, indicates, in part, the predicate register restoring operation. Bit position 36 of the instruction represents the mask bit 15 ($M_{15}$). Bit positions 40-37 of the instruction represent the opcode of the instruction, which in the embodiment shown indicates the predicate register restoring operation. It will be apparent, however, to one skilled in the art, that the restoring instruction can be of a different length, and that the placement and length of the mask and other fields within the instruction may also differ from the embodiment shown.

Returning to the flow diagram of FIG. 2, in step 206 of the present invention, the restoring instruction is decoded by the decoder unit of the processor. During the decoding step, the bits of the mask are extracted from the restoring instruction and joined together in a data path of the processor as a continuous string of bits, as shown in FIG. 1.

In step 208, the mask is provided to the restore unit which uses the mask to determine which predicate registers are to be restored. More specifically, for each bit of mask bits 14-0 that is set to one, a predicate register corresponding to that bit is restored with data from a corresponding bit position of a register identified in the restoring instructions. For each bit of mask bit of mask bits 14-0 that is set to 0, the corresponding predate register is not restored and is left unchanged. In step 210 of the present invention, it is determined whether mask bit 15 is set to one. If mask bit 15 is set to one, in step 212 predicate registers 63-15 are restored in the same manner. Otherwise, in step 214, predicate registers 63-15 are not restored and are left unchanged.

What is claimed is:

1. A method for restoring a first register set of a computer system comprising the steps of:

decoding a first instruction that specifies a restoring operation for the register set;

using a mask to select a plurality of registers of said first register set that are to be restored, said mask includes at least one bit corresponding to a plurality of registers in said first register set; and restoring the selected plurality of registers of said first register set, including wherein when said one bit is set, the plurality of registers corresponding to said one bit are restored in response to the first instruction.

2. The method of claim 1, wherein said mask consists of a first set of bits, with each bit of said first set of bits corresponding to a separate register of said first register set, wherein each register of said first register set corresponding to a set bit in said first set of bits is restored in response to the first instruction.

3. The method of claim 2, wherein said selected registers of said first register set are restored in parallel in response to said first instruction.

4. The method of claim 3, wherein said first register set consists of 1-bit-wide registers.

5. The method of claim 1, wherein said first register set consist of a predicate register set, wherein each register determines whether an instruction is to be executed.

6. The method of claim 5, wherein said first instruction has a fixed instruction size and includes said mask.

7. The method of claim 6, wherein said first instruction consists of 41 bits and said mask consists of 16 bits.

8. A computer-readable medium having stored thereon a plurality of instructions including a first set of instructions for restoring a first register set, said first set of instructions, when executed by a processor, cause said processor to perform the steps comprising of:

decoding a first instruction that specifies a restoring operation for the register set;

using a mask to select a plurality of registers of said first register set that are to be restored, said mask includes at least one bit corresponding to a plurality of registers in said first register set; and restoring the selected plurality of registers of said first register set, including wherein when said one bit is set, the plurality of registers corresponding to said one bit are restored in response to the first instruction.

9. The computer-readable medium of claim 8, wherein said mask consists of a first set of bits, with each bit of said first set of bits corresponding to a separate register of said first register set, wherein each register of said first register set corresponding to a set bit in said first set of bits is restored in response to the first instruction.

10. The computer-readable medium of claim 9, wherein said selected registers of said first register set are restored in parallel in response to said first instruction.

11. The computer-readable medium of claim 10, wherein said first register set consists of 1-bit-wide registers.

12. The computer-readable medium of claim 8, wherein said register set consists of predicate registers, wherein each register determines whether an instruction is to be executed.

13. The computer-readable medium of claim 12, wherein said first instruction has a fixed instruction size and includes said mask.

14. The computer-readable medium of claim 13, wherein said first instruction consists of 41 bits and said mask consists of 16 bits.

15. A computer system operable to restore a first register set comprising of:
- a decoder operable to decode a first instruction specifying a restore operation to be performed on a first register set;
- a restoring device operable to use a mask to select a plurality of registers of said first register set that are to be restored, said mask includes at least one bit corresponding to a plurality of registers in said first register set; and
- the restoring device further operable to restore the selected plurality of registers, including wherein when said one bit is set, the plurality of registers corresponding to said one bit are restored in response to the first instruction.

16. The computer system of claim 15, wherein said mask consists of a first set of bits, with each bit of said first set of bits corresponding to a separate register of said first register set, wherein said restoring device is further operable to restore each register of said first register set corresponding to any bit set to one in said first set of bits.

17. The computer system of claim 16, wherein said restoring device is operable to restore said selected registers in parallel.

18. The computer system of claim 17, wherein said first register set consists of 1-bit-wide registers.

19. The computer system of claim 18, wherein said first register set consists of predicate registers, wherein each register determines whether an instruction is to be executed.

20. The computer system of claim 19, wherein said first instruction has a fixed instruction size and includes said mask.

21. The computer system of claim 20, wherein said first instruction consists of 41 bits and said mask consists of 16 bits.

* * * * *